(12) United States Patent
Primiani et al.

(10) Patent No.: US 8,869,068 B2
(45) Date of Patent: Oct. 21, 2014

(54) CONTENT SHARING APPLICATION UTILIZING RADIALLY-DISTRIBUTED MENUS

(75) Inventors: Joseph Primiani, Palo Alto, CA (US); Matthew Michelsen, San Diego, CA (US)

(73) Assignee: Backplane, Inc., San Diego, CA (US)

( * ) Notice: Subject to any disclaimer, the term of this patent is extended or adjusted under 35 U.S.C. 154(b) by 0 days.

(21) Appl. No.: 13/553,713

(22) Filed: Jul. 19, 2012

(65) Prior Publication Data
US 2013/0132904 A1    May 23, 2013

Related U.S. Application Data

(60) Provisional application No. 61/609,192, filed on Mar. 9, 2012, provisional application No. 61/562,830, filed on Nov. 22, 2011.

(51) Int. Cl.
| | | |
|---|---|---|
| *G06F 3/048* | (2013.01) | |
| *G06F 3/0482* | (2013.01) | |
| *G06F 3/0488* | (2013.01) | |
| *G06F 17/24* | (2006.01) | |

(52) U.S. Cl.
CPC ............ *G06F 3/048* (2013.01); *G06F 3/04883* (2013.01); *G06F 3/0482* (2013.01); *G06F 3/04886* (2013.01); *G06F 17/241* (2013.01); *G06F 2203/04807* (2013.01); *G06F 3/0488* (2013.01)
USPC ............................ 715/834; 715/810; 715/826

(58) Field of Classification Search
CPC . G06F 3/0482; G06F 3/0488; G06F 3/04883; G06F 3/04886; G06F 2203/04807; G06F 17/241

USPC .......................................... 715/834, 810, 826
See application file for complete search history.

(56) References Cited

U.S. PATENT DOCUMENTS

| | | | |
|---|---|---|---|
| 6,549,219 | B2 | 4/2003 | Selker |
| 7,712,049 | B2 | 5/2010 | Williams et al. |
| 7,991,764 | B2 | 8/2011 | Rathod |
| 2006/0117067 | A1* | 6/2006 | Wright et al. .............. 707/104.1 |
| 2007/0035513 | A1* | 2/2007 | Sherrard et al. .............. 345/157 |
| 2007/0136690 | A1* | 6/2007 | MacLaurin et al. .......... 715/822 |

(Continued)

OTHER PUBLICATIONS

Jolie O'Dell, "Cortex for Chrome Makes Sharing Faster, Prettier & More Fun Than Ever", Dec. 8, 2010, http://mashable.com/2010/12/08/cortex/.*

(Continued)

*Primary Examiner* — Patrick Riegler
(74) *Attorney, Agent, or Firm* — Wilson Sonsini Goodrich & Rosati

(57) ABSTRACT

Disclosed herein are encoded computer readable storage media and computer-implemented systems creating a content sharing application comprising: a software module for identifying content to share; a software module for displaying a radially-distributed menu of destinations for identified content in response to a first user interaction, wherein said menu of destinations allows a user to select at least one destination; a software module for displaying a radially-distributed menu of individuals associated with one or more displayed destinations in response to a second user interaction, wherein said menu of individuals allows a user to select at least one individual; and a software module for customizing said radially-distributed menus. Also disclosed are methods for rapidly sharing content utilizing the same.

22 Claims, 7 Drawing Sheets

(56) References Cited

U.S. PATENT DOCUMENTS

| | | | |
|---|---|---|---|
| 2007/0162953 A1* | 7/2007 | Bolliger et al. | 725/142 |
| 2007/0256029 A1* | 11/2007 | Maxwell | 715/834 |
| 2008/0059906 A1* | 3/2008 | Toki | 715/810 |
| 2008/0059913 A1* | 3/2008 | Burtner et al. | 715/854 |
| 2008/0071791 A1 | 3/2008 | Bates et al. | |
| 2009/0125511 A1* | 5/2009 | Kumar | 707/5 |
| 2009/0144392 A1 | 6/2009 | Wang et al. | |
| 2009/0234876 A1 | 9/2009 | Schigel et al. | |
| 2009/0327963 A1 | 12/2009 | Mouilleseaux et al. | |
| 2010/0159966 A1 | 6/2010 | Friedman et al. | |
| 2010/0185985 A1 | 7/2010 | Chmielewski et al. | |
| 2010/0192101 A1 | 7/2010 | Chmielewski et al. | |
| 2010/0235762 A1 | 9/2010 | Laiho et al. | |
| 2010/0251180 A1 | 9/2010 | Cragun et al. | |
| 2010/0281430 A1* | 11/2010 | Safar | 715/834 |
| 2010/0333029 A1* | 12/2010 | Smith et al. | 715/834 |
| 2010/0333030 A1* | 12/2010 | Johns | 715/834 |
| 2011/0010384 A1 | 1/2011 | Luo et al. | |
| 2011/0029610 A1 | 2/2011 | Chao et al. | |
| 2011/0066980 A1 | 3/2011 | Chmielewski et al. | |
| 2011/0066981 A1 | 3/2011 | Chmielewski et al. | |
| 2011/0138293 A1 | 6/2011 | Koren | |
| 2011/0197146 A1 | 8/2011 | Goto et al. | |
| 2011/0202430 A1 | 8/2011 | Narayanan et al. | |
| 2011/0208822 A1 | 8/2011 | Rathod | |
| 2011/0209093 A1 | 8/2011 | Hinckley et al. | |
| 2011/0258526 A1* | 10/2011 | Supakkul et al. | 715/230 |
| 2011/0265035 A1* | 10/2011 | Lepage et al. | 715/810 |
| 2011/0265041 A1* | 10/2011 | Ganetakos et al. | 715/834 |
| 2011/0307840 A1* | 12/2011 | Harris et al. | 715/863 |
| 2012/0036434 A1* | 2/2012 | Oberstein | 715/702 |
| 2012/0066602 A1 | 3/2012 | Chai et al. | |
| 2012/0072855 A1 | 3/2012 | Baldwin et al. | |
| 2012/0079427 A1* | 3/2012 | Carmichael et al. | 715/825 |
| 2012/0110464 A1* | 5/2012 | Chen et al. | 715/738 |
| 2012/0110474 A1* | 5/2012 | Chen et al. | 715/753 |
| 2012/0136941 A1* | 5/2012 | Howes et al. | 709/206 |
| 2012/0197980 A1* | 8/2012 | Terleski et al. | 709/203 |
| 2012/0226978 A1* | 9/2012 | Harberts et al. | 715/702 |

OTHER PUBLICATIONS

Google Chrome Cortex: Review of Social Media Extension, [online] Dec. 29, 2010, [retrieved on Jul. 12, 2012], Retrieved from the internet: http://news24.hubpages.com/hub/Google-Chrome-Cortex-Review-of-Social-Media-Extension.

Cortex Promo, [online] Oct. 23, 2010, [retrieved on Jul. 18, 2012] Retrieved from the internet; http://www.youtube.com/watch?v=jvNItBV115E&feature=player_embedded#!.

Cortex share fast, [online] 2012, [retrieved on Jul. 18, 2012]. Retrieved from the internet: http://cortexapp.com/.

Chrome Extension to Share Everything on Your Favorite Social Network, from the Devils' Workshop the Tech Community Blog, [online] 2012, [retrieved on Jul. 13, 2012]. Retrieved from the internet: http://devilsworkshop.org/chrome-extension-share-click/.

PCT/US2012/064688 International Search Report and Written Opinion dated Mar. 21, 2013.

PCT/US2012/064688 Preliminary Report on Patentability dated Jun. 5, 2014.

* cited by examiner

CONTENT SHARING APPLICATION UTILIZING RADIALLY-DISTRIBUTED MENUS

CROSS REFERENCE TO RELATED APPLICATIONS

This application claims the benefit of U.S. Application Ser. No. 61/609,192, filed Mar. 9, 2012, and U.S. Application Ser. No. 61/562,830, filed Nov. 22, 2011, each of which is hereby incorporated by reference in its entirety.

BACKGROUND OF THE INVENTION

In the United States 79% of the population uses the internet and, in 2010, the average American spent 32 hours per month engaged in this activity. A common activity is sharing content with friends, family, colleagues, and the public, via various electronic channels. According to a 2011 study by America Online and Nielsen, twenty-seven million pieces of computer-based content, such as articles, photos, and videos are shared each day and 23% of social media messages include links to content.

SUMMARY OF THE INVENTION

Current mechanisms and processes for sharing computer-based content are slow and tedious to use. Moreover, current mechanisms, including buttons, links, and pop-up windows to share content, where they exist, vary in appearance and function across web sites, applications, and platforms. Even if a user becomes familiar with the content sharing mechanisms on their most favored web sites, this knowledge does not transfer well to other platforms, such as mobile devices, or other applications, such as word processors. Despite enduring efforts, there is a long-felt and unmet need for an application that offers easy-to-access and extremely fast content sharing that does not impose a high cognitive load on users. Such a content sharing application should offer a consistent format that makes use of muscle memory to achieve efficiency.

Accordingly, in one aspect, disclosed herein are computer readable storage media encoded with a computer program including instructions executable by a digital processing device to create a content sharing application comprising: a software module for identifying content to share; a software module for displaying a radially-distributed menu of destinations for identified content in response to a first user interaction, wherein said menu of destinations allows a user to select at least one destination; a software module for displaying a radially-distributed menu of individuals associated with one or more displayed destinations in response to a second user interaction, wherein said menu of individuals allows a user to select at least one individual; and a software module for customizing said radially-distributed menu of destinations and said radially-distributed menu of individuals. In some embodiments, content identified for sharing and/or shared comprises one or more of: a web site, a web page, text, a link, an image, a video, an audio, a multimedia, and an executable. In some embodiments, a first user interaction is selected from the group consisting of: double tap, double touch, double click, tap and hold, touch and hold, click and hold, right click, keystroke, keystroke combination, combination of keystroke and tap, combination of keystroke and touch, combination of keystroke and click, and voice command. In some embodiments, a radially-distributed menu of destinations optionally displays between about 2 and about 14 destinations simultaneously. In further embodiments, a radially-distributed menu of destinations optionally displays between about 4 and about 8 destinations simultaneously. In some embodiments, a radially-distributed menu of destinations allows a user to select a plurality of displayed destinations. In further embodiments, a radially-distributed menu of destinations allows a user to select all displayed destinations. In some embodiments, a radially-distributed menu of destinations is partially radial. In other embodiments, a radially-distributed menu of destinations is a pie menu. In some embodiments, a radially-distributed menu of destinations optionally operates in a marking menu mode. In some embodiments, selection of at least one destination causes the content sharing application to share the identified content to said at least one destination. In some embodiments, a second user interaction is selected from the group consisting of: tap, touch, click, tap and drag, touch and drag, click and drag, swipe, and voice command. In some embodiments, a radially-distributed menu of individuals optionally displays between about 2 and about 14 individuals simultaneously. In further embodiments, a radially-distributed menu of individuals optionally displays between about 4 and about 8 individuals simultaneously. In some embodiments, a radially-distributed menu of individuals displays a representative photograph or image of each individual. In some embodiments, a radially-distributed menu of individuals allows a user to select a plurality of displayed individuals. In further embodiments, a radially-distributed menu of individuals allows a user to select all displayed individuals. In some embodiments, a radially-distributed menu of individuals is partially radial. In other embodiments, a radially-distributed menu of individuals is a pie menu. In some embodiments, a radially-distributed menu of individuals optionally operates in a marking menu mode. In some embodiments, selection of at least one individual causes the content sharing application to share the identified content to said at least one individual. In some embodiments, a module for displaying a radially-distributed menu of destinations responds to a third user interaction by changing destinations displayed. In further embodiments, a third user interaction is selected from the group consisting of: tap, touch, click, tap and drag, touch and drag, click and drag, swipe, multipoint touch and rotate, scroll, and voice command. In some embodiments, a module for displaying a radially-distributed menu of individuals responds to a third user interaction by changing individuals displayed. In further embodiments, a third user interaction is selected from the group consisting of: tap, touch, click, tap and drag, touch and drag, click and drag, swipe, multipoint touch and rotate, scroll, and voice command. In some embodiments, a content sharing application described herein further comprises a software module for annotating shared content. In further embodiments, a module for annotating shared content allows a user to associate text, audio, video, or multimedia with shared content. In some embodiments, a content sharing application described herein further comprises a software module for storing content sharing data. In some embodiments, a content sharing application described herein is implemented as a web browser extension, plug-in, add-in, or add-on. In other embodiments, a content sharing application described herein is implemented as a mobile application. In yet other embodiments, a content sharing application described herein is implemented as a standalone application. In some embodiments, a software module for customizing a radially-distributed menu of destinations and a radially-distributed menu of individuals allows a user to add, remove, or select one or more menu items. In some embodiments, a software module for customizing a radially-distributed menu of destinations and a radially-distributed menu of individuals allows a user to select a shape or orientation for the menu.

In another aspect, disclosed herein are computer-implemented systems for rapidly sharing content comprising: a networked digital processing device comprising an operating system configured to perform executable instructions and a memory device; a computer program including instructions executable by the digital processing device to create a content sharing application comprising: a software module for identifying content to share; a software module for displaying a radially-distributed menu of destinations for identified content in response to a first user interaction, wherein said menu of destinations allows a user to select at least one destination; a software module for displaying a radially-distributed menu of individuals associated with one or more displayed destinations in response to a second user interaction, wherein said menu of individuals allows a user to select at least one individual; and a software module for customizing said radially-distributed menu of destinations and said radially-distributed menu of individuals. In some embodiments, content identified for sharing and/or shared comprises one or more of: a web site, a web page, text, a link, an image, a video, an audio, a multimedia, and an executable. In some embodiments, a first user interaction is selected from the group consisting of: double tap, double touch, double click, tap and hold, touch and hold, click and hold, right click, keystroke, keystroke combination, combination of keystroke and tap, combination of keystroke and touch, combination of keystroke and click, and voice command. In some embodiments, a radially-distributed menu of destinations optionally displays between about 2 and about 14 destinations simultaneously. In further embodiments, a radially-distributed menu of destinations optionally displays between about 4 and about 8 destinations simultaneously. In some embodiments, a radially-distributed menu of destinations allows a user to select a plurality of displayed destinations. In further embodiments, a radially-distributed menu of destinations allows a user to select all displayed destinations. In some embodiments, a radially-distributed menu of destinations is partially radial. In other embodiments, a radially-distributed menu of destinations is a pie menu. In some embodiments, a radially-distributed menu of destinations optionally operates in a marking menu mode. In some embodiments, selection of at least one destination causes the content sharing application to share the identified content to said at least one destination. In some embodiments, a second user interaction is selected from the group consisting of: tap, touch, click, tap and drag, touch and drag, click and drag, swipe, and voice command. In some embodiments, a radially-distributed menu of individuals optionally displays between about 2 and about 14 individuals simultaneously. In further embodiments, a radially-distributed menu of individuals optionally displays between about 4 and about 8 individuals simultaneously. In some embodiments, a radially-distributed menu of individuals displays a representative photograph or image of each individual. In some embodiments, a radially-distributed menu of individuals allows a user to select a plurality of displayed individuals. In further embodiments, a radially-distributed menu of individuals allows a user to select all displayed individuals. In some embodiments, a radially-distributed menu of individuals is partially radial. In other embodiments, a radially-distributed menu of individuals is a pie menu. In some embodiments, a radially-distributed menu of individuals optionally operates in a marking menu mode. In some embodiments, selection of at least one individual causes the content sharing application to share the identified content to said at least one individual. In some embodiments, a module for displaying a radially-distributed menu of destinations responds to a third user interaction by changing destinations displayed. In further embodiments, a third user interaction is selected from the group consisting of: tap, touch, click, tap and drag, touch and drag, click and drag, swipe, multipoint touch and rotate, scroll, and voice command. In some embodiments, a module for displaying a radially-distributed menu of individuals responds to a third user interaction by changing individuals displayed. In further embodiments, a third user interaction is selected from the group consisting of: tap, touch, click, tap and drag, touch and drag, click and drag, swipe, multipoint touch and rotate, scroll, and voice command. In some embodiments, a content sharing application described herein further comprises a software module for annotating shared content. In further embodiments, a module for annotating shared content allows a user to associate text, audio, video, or multimedia with shared content. In some embodiments, a content sharing application described herein further comprises a software module for storing content sharing data. In some embodiments, a computer program described herein comprises a web browser extension, plug-in, add-in, or add-on. In some embodiments, a computer program described herein comprises a mobile application. In some embodiments, a networked digital processing device described herein is a mobile device. In some embodiments, a computer program described herein comprises a standalone application. In some embodiments, a software module for customizing a radially-distributed menu of destinations and a radially-distributed menu of individuals allows a user to add, remove, or select one or more menu items. In some embodiments, a software module for customizing a radially-distributed menu of destinations and a radially-distributed menu of individuals allows a user to select a shape or orientation for the menu.

In another aspect, disclosed herein are computer-implemented methods for rapidly sharing content comprising the steps of: providing a software module for allowing a user to designate, in a computer memory, a plurality of sharing destinations and a plurality of individuals associated with one or more sharing destinations; providing a software module for allowing said user to identify computer-based content to share; providing a software module for generating, on a computer display, a radially-distributed menu of said sharing destinations for identified content in response to a first user interaction, wherein said menu of destinations allows a user to select at least one destination; providing a software module for generating, on a computer display, a radially-distributed menu of said individuals associated with one or more sharing destinations in response to a second user interaction, wherein said menu of individuals allows a user to select at least one individual; and sharing, by the internet, identified content to selected destinations and individuals.

DETAILED DESCRIPTION OF THE INVENTION

Figure 1:
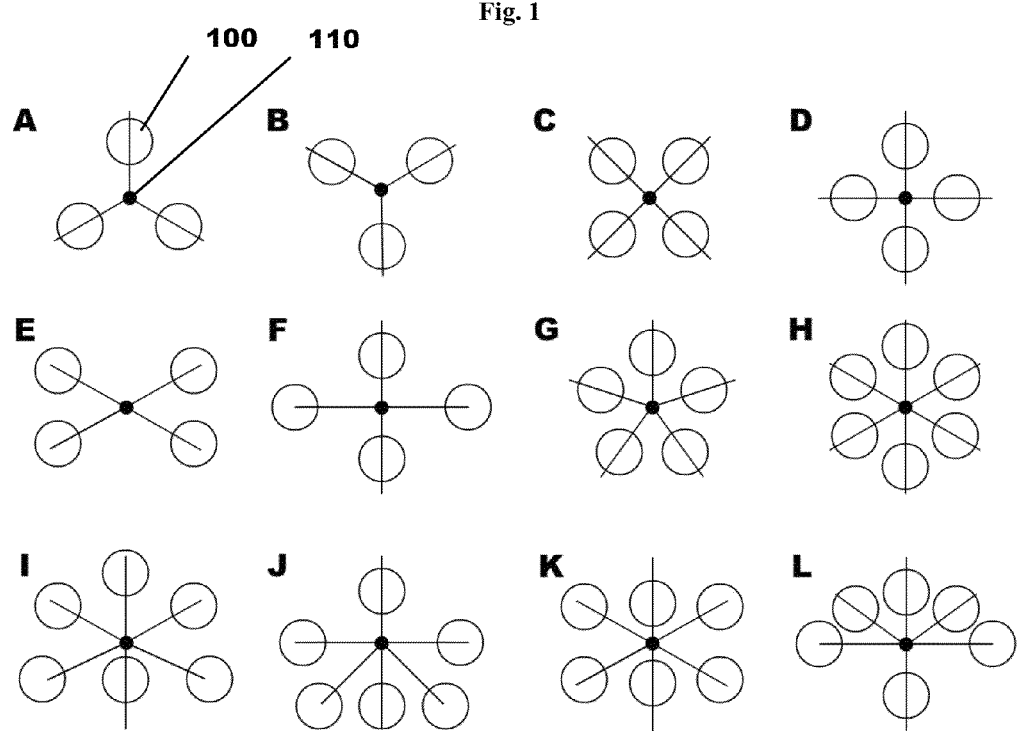
FIG. 1 shows a series (A-L) of non-limiting examples of menu items arranged around a point in radially-distributed patterns.

Described herein, in various embodiments, are systems, platforms, media, applications, and methods for rapidly and efficiently sharing computer-based content. Advantages of the systems, platforms, media, applications, and methods described herein include, but are not limited to, rapid sharing of a wide variety of computer-based content types, rapid sharing to a multitude of social networks, online platforms, and mobile destinations, an easy-to-access graphic user interface (GUI) that is consistent across web sites, applications, and platforms, use of radially-distributed menus to leverage established axioms of human-computer interaction, and a high degree of user configurability.

Also described herein, in various embodiments, are computer readable storage media encoded with a computer program including instructions executable by a digital processing device to create a content sharing application comprising: a software module for identifying content to share; a software module for displaying a radially-distributed menu of destinations for identified content in response to a first user interaction, wherein said menu of destinations allows a user to select at least one destination; a software module for displaying a radially-distributed menu of individuals associated with one or more displayed destinations in response to a second user interaction, wherein said menu of individuals allows a user to select at least one individual; and a software module for customizing said radially-distributed menu of destinations and said radially-distributed menu of individuals.

Also described herein, in various embodiments, are computer-implemented systems for rapidly sharing content comprising: a networked digital processing device comprising an operating system configured to perform executable instructions and a memory device; a computer program including instructions executable by the digital processing device to create a content sharing application comprising: a software module for identifying content to share; a software module for displaying a radially-distributed menu of destinations for identified content in response to a first user interaction, wherein said menu of destinations allows a user to select at least one destination; a software module for displaying a radially-distributed menu of individuals associated with one or more displayed destinations in response to a second user interaction, wherein said menu of individuals allows a user to select at least one individual; and a software module for customizing said radially-distributed menu of destinations and said radially-distributed menu of individuals.

Also described herein, in various embodiments, are computer-implemented methods for rapidly sharing content comprising the steps of: providing a software module for allowing a user to designate, in a computer memory, a plurality of sharing destinations and a plurality of individuals associated with one or more sharing destinations; providing a software module for allowing said user to identify computer-based content to share; providing a software module for generating, on a computer display, a radially-distributed menu of said sharing destinations for identified content in response to a first user interaction, wherein said menu of destinations allows a user to select at least one destination; providing a software module for generating, on a computer display, a radially-distributed menu of said individuals associated with one or more sharing destinations in response to a second user interaction, wherein said menu of individuals allows a user to select at least one individual; and sharing, by the internet, identified content to selected destinations and individuals.

VARIOUS DEFINITIONS

Unless otherwise defined, all technical and scientific terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

As used herein, "radially-distributed" refers to a menu having menu items arranged in a pattern that radiates from a point.

As used herein, "pie menu" means a substantially circular menu made by arrangement of menu items, or "pie slices," around a central point where selection of a menu item depends on direction rather than distance. In some cases, "pie menu" is used interchangeably with "radial menu."

As used herein, "marking menu" refers to a radially-distributed menu designed to allow a user to perform a menu selection by making a straight mark or gesture in the direction of the desired menu item without displaying the actual menu. In some cases, a radially-distributed menu, such as a pie menu, operates in a "marking menu mode" wherein a user performs menu selections without displaying the actual menu.

As used herein, "destination" means any forum, network, site, platform, or service where content is optionally shared with one or more individuals, one or more groups, or the online public. Non-limiting examples of destinations include Facebook, Twitter, Tumblr, Instapaper, Google+, email, and blogs.

Content Sharing Application

In some embodiments, the systems, platforms, media, applications, and methods described herein include content sharing application, or provision and/or use of the same. In some embodiments, a content sharing application described herein includes a software module for identifying content to share. In some embodiments, a content sharing application described herein includes a software module for displaying a radially-distributed menu of destinations for identified content. In some embodiments, a content sharing application described herein includes a software module for displaying a radially-distributed menu of individuals associated with one or more displayed destinations. In some embodiments, a content sharing application described herein includes a software module for customizing appearance and functionality, including that of radially-distributed menus. In some embodiments, a content sharing application described herein includes a software module for annotating content identified for sharing or shared. In some embodiments, a content sharing application described herein includes a software module for sending content identified to share to selected destinations and/or individuals via one or more electronic communications channels. In some embodiments, a content sharing application described herein includes a software module for storing content sharing data.

In some embodiments, a content sharing application described herein is implemented, in part or in whole, as embedded code in a web page or a web site. In some embodiments, a content sharing application described herein is implemented, in part or in whole, as an extension, plug-in, add-in, or add-on for a stationary and/or mobile browser. In further embodiments, a content sharing application functions consistently across web pages and/or web sites. In some embodiments, a content sharing application described herein is implemented, in part or in whole, as mobile application. In further embodiments, a content sharing application functions consistently across mobile applications used. In some embodiments, a content sharing application described herein is implemented, in part or in whole, as standalone application. In further embodiments, a content sharing application functions consistently across applications used.

In some embodiments, a content sharing application described herein is self-revealing. For example, in such embodiments, the menus and other elements of the content sharing application's GUI appear when a user indicates that they are needed or otherwise activates them. Conversely, when a user is done sharing content the menus and other elements of the content sharing application's GUI fade from view or disappear to preserve display space. In other embodiments, an element of a content sharing application, such as a button, icon, or link is visible and available to allow activation. By way of non-limiting examples, in such embodiments, a button is available on an operating system toolbar, a button is available on an application toolbar, an icon is displayed over other screen content, or a link is available on a web site.

Identifying Content

In some embodiments, the systems, platforms, media, applications, and methods described herein include a software module for allowing a user to identify content to share, or provision and/or use of the same. Many types of content are suitable for identification as content to share as are many formats for each content type. In various embodiments, suitable content includes, by way of non-limiting examples, web pages, web sites, and URLs (e.g., top level domains, directory level URLs, and document level URLs, etc.). In further various embodiments, suitable content includes, by way of non-limiting examples, text files, e-book files, audio files, image files (e.g., photographs, illustrations, screen captures, etc.), video files (e.g., screen capture video, etc.), multimedia files (e.g., interactive applications, games, etc.), executable files (e.g., applications, etc.), and combinations thereof.

Many text formats are suitable including, by way of non-limiting examples, Rich Text Format (RTF), TXT, and HTML formatted text.

Many e-book formats are suitable including, by way of non-limiting examples, plain text, hypertext markup language (HTML), Amazon® Kindle™, Open Electronic Package, TomeRaider, Arghos Diffusion, Flip Books, ANSI/NISO Z39.86 (DAISY), FictionBook, Text Encoding Initiative, Plucker, Compressed HM, Portable Document Format, PostScript, DjVu, Microsoft LIT, eReader, Desktop Author, Newton eBook, Founder Electronics, Libris, Mobipocket, EPUB, Broadband eBooks (BBeB), SSReader, TealDoc, IEC 62448, and Comic Book Archive file. Suitable e-books include those formatted for viewing on, by way of non-limiting examples, Apple® iPad®, Amazon® Kindle™, Barnes & Noble Nook™, Sony® Reader™, iRex iLiad, the Enke Hanlin eReader, Bookeen CyBook, Endless Ideas BeBook, and the Kobo™ eReader.

Many audio formats are suitable including, by way of non-limiting examples, MP3, WAV, AIFF, AU, Apple® Lossless, MPEG-4, Windows Media®, Vorbis, AAC, and Real Audio®.

Many video formats are suitable including, by way of non-limiting examples, Windows Media Video (WMV), Motion Picture Experts Group (MPEG), Audio Video Interleave (AVI), QuickTime®, Real Media®, and Windows Media®. In some embodiments, the images and/or videos are uncompressed (e.g., RAW format). In other embodiments, images and/or videos are compressed. Both lossy and lossless video CODECs are suitable including, by way of non-limiting examples, Cineform, Cinepak, Dirac, DV, FFV1, H.263, H.264, H.264 lossless, JPEG 2000, MPEG-1, MPEG-2, MPEG-4, On2 Technologies (VP5, VP6, VP7, and VP8), RealVideo, Snow lossless, Sorenson Video, Theora, and Windows Media Video (WMV).

Many multimedia formats are suitable including, by way of non-limiting examples, Adobe® Flash®, Apple® QuickTime®, Microsoft® Silverlight®, Java™, HTML 5, XHTML 5, and Unity®.

In some embodiments, a software module for identifying content to share is activated by a user in response to a user interaction. In some embodiments, a user identifies content to share using a pointing device including, by way of non-limiting examples, a mouse, trackball, trackpad, joystick, pen, or stylus. In further embodiments, a user identifies content to share with a pointing device by actions including, by way of non-limiting examples, click, click and hold, double click, right click, shift-click, control-click, command-click, drag, draw, and highlight. In some embodiments, a user identifies content to share using a touch screen display or multi-touch screen display. In further embodiments, a user identifies content to share with a touch screen or multi-touch screen by gestures including, by way of non-limiting examples, tap (e.g., touch), double tap, tap (e.g., touch) and hold, swipe, drag, pinch, reverse pinch, draw, and highlight. In some embodiments, a user identifies content to share using a keyboard, keypad, or alternative text input device, by keystroke, combination of keystrokes, or sequence of keystrokes. In other embodiments, a user identifies content to share using a microphone to capture voice or other sound input. In other embodiments, a user identifies content to share using a video camera to capture motion or visual input.

In a particular non-limiting embodiment, a user identifies content to share by using a mouse to click and hold on an image in a web page. In another particular non-limiting embodiment, a user identifies content to share by using a touch screen display to touch and hold on a document on a computer hard drive. In yet another particular non-limiting embodiment, a user identifies content to share by highlighting text with a mouse and executing a keystroke. In yet another particular non-limiting embodiment, a user identifies content to share by executing a voice command to create a screen capture image. In yet another particular non-limiting embodiment, a user identifies content to share by using a stylus to draw a box around a portion of a word processing document.

In some embodiments, a user interaction that activates a software module for identifying content to share also activates a software module for displaying a radially-distributed menu of destinations for identified content.

Menu of Destinations

In some embodiments, the systems, platforms, media, applications, and methods described herein include a software module for displaying a radially-distributed menu of destinations for identified content, or provision and/or use of the same. In some embodiments, a radially-distributed menu of destinations includes menu items arranged in a pattern that radiates from a point. In further embodiments, menu items are arranged in a pattern wherein each menu item radiates the same distance from a point, forming a circle. In other embodiments, menu items are arranged in a pattern wherein menus items radiate the same and/or different distances from a point, forming a particular shape. Accordingly, a radially-distributed menu has many suitable shapes and sizes. Suitable shapes include, by way of non-limiting examples, substantially circular, semi-circular, partially circular, substantially elliptical, semi-elliptical, substantially ovoid, semi-ovoid, substantially square, substantially diamond, substantially rectangular, substantially triangular, substantially pentagonal, substantially hexagonal, substantially octagonal, and the like. Suitable sizes are generally regulated by available display space and by the number of menu items.

Referring to FIG. 1, a series of non-limiting examples of menu items 100 arranged in radially-distributed patterns around a point 110 are shown. FIG. 1 exemplifies triangular arrangements (see FIGS. 1A and 1B), square arrangements (see FIG. 1C), diamond arrangements (see FIGS. 1D and 1F), rectangular arrangements (see FIG. 1E), pentagonal arrangements (see FIG. 1G), hexagonal arrangements (see FIG. 1H), and partially elliptical arrangements (see FIGS. 1I-1L).

A software module for displaying a radially-distributed menu of destinations for identified content suitably displays menu items in a wide variety of forms. In some embodiments, each menu item represents a sharing destination for identified content. Any representation that identifies a destination to a user is suitable. In further embodiments, a menu item represents a destination with, by way of non-limiting examples, text, an icon, a logo, an avatar, a button, a photograph, an illustration, a shape, a symbol, a letter, a number, a color, and combinations thereof. Many destinations are suitable for sharing content including, by way of non-limiting examples, email, instant messaging, social networks, blogs, online platforms, and mobile destinations. By way of further examples, suitable destinations include Backplane, Badoo, Bebo, Blogger, Blogster, Buzzfeed, CafeMom, Classmates.com, Delicious, DeviantART, Digg, Diglo, Facebook, FARK, Flixster, Flickr, Fotolog, Foursquare, Friendfeed, Friends Reunited, Friendster, Google+, Habbo, LinkedIn, Livejournal, Meetup, Mixi, Mylife, Myspace, MyYearbook, Netlog, Ning, Pingsta, Pinterest, Plaxo, Reddit, Slashdot, SoundCloud, Stumbleupon, Tagged, Tumblr, Tweetmeme, Twitter, Yammer, Yelp, YouTube, Vimeo, and the like. In some embodiments, a sharing destination is an individual or a group of individuals. In further embodiments, an individual or a group of individuals is associated with one or more other sharing destinations. For example, a menu of destinations for identified content may include a menu item representing a group of Facebook friends, LinkedIn contacts, instant messenger contacts, email contacts, Twitter followers, blog subscribers, and the like.

In some embodiments, a software module for displaying a radially-distributed menu of destinations for identified content displays a pie menu or a radial menu. Radially-distributed menus, such as pie menus or radial menus, have advantages over linear menus (e.g., dropdown menus, etc.). Pie menus include wedge-shaped menu items that are equidistant from the center of the menu. Therefore, selection depends on direction rather than distance. Accordingly, pie menus take advantage of human muscle memory, the ability to remember muscle motion and direction. In light of the disclosure provided herein those of skill in the art will understand that Fitt's Law predicts that the time required for a user to select a menu item is a function of the distance to the item and the size of the item. Radially-distributed menus, such as pie menus or radial menus offer the additional advantage of low selection (e.g., menu item acquisition) times and low error rates. This is due to the fact that each menu item is the same small distance from the center of the menu and the wedge-shaped menu items get larger, and easier to acquire, as a user moves away from the center of the menu.

A radially-distributed menu of destinations for identified content described herein suitably displays a wide range of numbers of menu items. In various embodiments, a radially-distributed menu of destinations simultaneously displays 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 or more menu items. In some embodiments, a radially-distributed menu of destinations simultaneously displays about 2 to about 20 menu items. In further embodiments, a radially-distributed menu of destinations simultaneously displays about 3 to about 16 menu items. In further embodiments, a radially-distributed menu of destinations simultaneously displays about 4 to about 12 menu items. In further embodiments, a radially-distributed menu of destinations simultaneously displays about 5 to about 10 menu items. In further embodiments, a radially-distributed menu of destinations simultaneously displays about 6 to about 8 menu items.

In some embodiments, a software module for displaying a radially-distributed menu of destinations for identified content displays an opaque menu. In other embodiments, a software module for displaying a radially-distributed menu of destinations for identified content displays a partially transparent menu. In further embodiments, a partially transparent menu allows a user to observe content underlying an activated menu.

Figure 2:
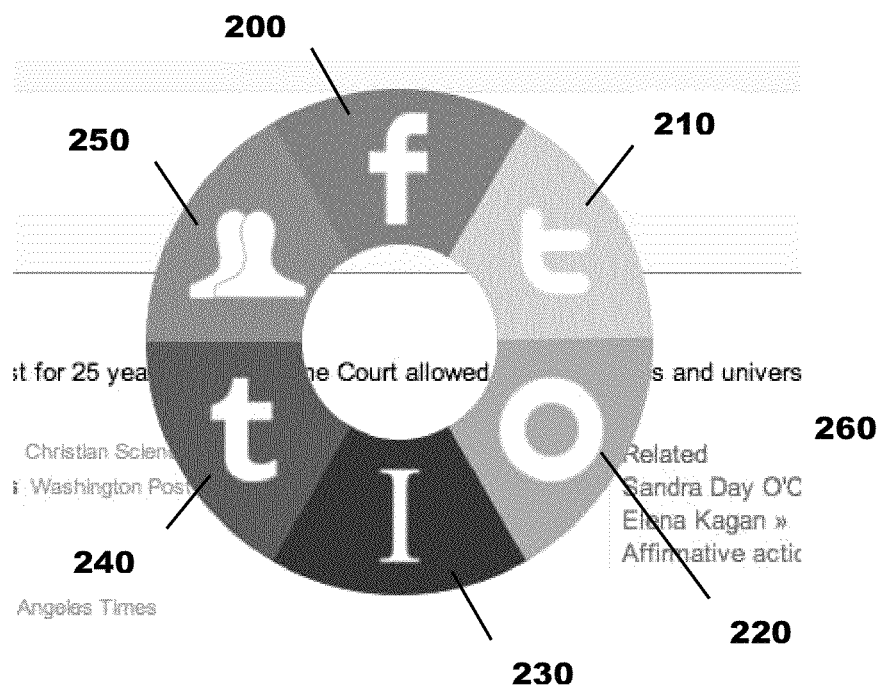
FIG. 2 shows a non-limiting example of a radially-distributed menu of content sharing destinations; in this case, a pie menu allowing a user to select from among the destinations: Facebook, Twitter, Backplane, Instapaper, Tumblr, and individual Facebook friends. In this example, a pie menu of destinations is displayed in a web browser overlaying web page content.

Referring to FIG. 2, in a particular non-limiting embodiment, a software module for displaying a radially-distributed menu of destinations for identified content displays a pie menu or radial menu of online content sharing destinations. In this embodiment, six menu items represent Facebook 200, Twitter 210, Backplane 220, Instapaper 230, Tumblr 240, and a designated group of Facebook friends 250 with associated icons and colors. Further in this embodiment, selection of a Facebook friends 250 destination activates a second radially-distributed menu of individuals. See e.g., FIGS. 4 and 5. In this embodiment, a pie menu of destinations is opaque and displayed overlaying the identified content 260.

In some embodiments, a software module for displaying a radially-distributed menu of destinations for identified content displays a menu in response to a first user interaction. In further embodiments, a menu is displayed in response to a user interaction indicating a desire to select one or more sharing destinations for identified content. In still further embodiments, a menu of destinations is displayed in response to a user interaction that is the same interaction wherein a user identifies content to share. In some embodiments, a menu of destinations is displayed in response to user interaction via a pointing device including, by way of non-limiting examples, a mouse, trackball, trackpad, joystick, pen, or stylus. In further embodiments, a first user interaction is, by way of non-limiting examples, click, click and hold, double click, right click, shift-click, control-click, command-click, drag, draw, and highlight. In some embodiments, a menu of destinations is displayed in response to user interaction via a touch screen display or multi-touch screen display. In further embodiments, a first user interaction is, by way of non-limiting examples, tap (e.g., touch), double tap, tap (e.g., touch) and hold, swipe, drag, pinch, reverse pinch, draw, and highlight.

In some embodiments, a menu of destinations is displayed in response to user interaction via a keyboard, keypad, or alternative text input device. In further embodiments, a first user interaction is a keystroke, combination of keystrokes, or sequence of keystrokes. In other embodiments, a menu of destinations is displayed in response to user interaction via a microphone to capture voice or other sound input. In further embodiments, a first user interaction is a voice command. In a particular embodiment, a voice command includes a component to trigger display of a menu of destinations, for example, a user speaking "Cortex." In a further embodiment, a voice command includes a component to select one or more destinations from the menu of destinations, for example, a user speaking "post to Facebook." In this non-limiting example, a voice command such as "Cortex . . . post to Facebook" would both cause a software module for displaying a radially-distributed menu of destinations to appear over currently selected content and select a particular menu item indicating a destination for the content. In other embodiments, a menu of destinations is displayed in response to user interaction via a video camera to capture motion or visual input. In further embodiments, a first user interaction is a gesture. In still further embodiments, a first user interaction is a combination of interactions described herein.

Figure 3:
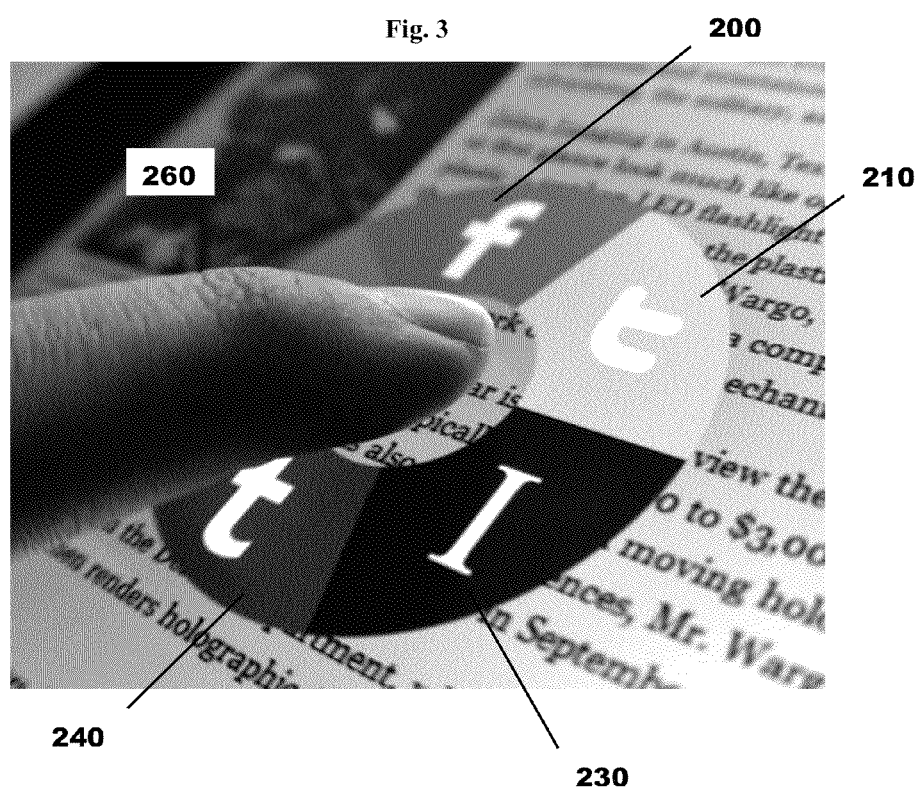
FIG. 3 shows a non-limiting example of a radially-distributed menu of content sharing destinations; in this case, a pie menu displayed in response to a user's interaction with a touchscreen of a mobile device. In this example, a pie menu of destinations is displayed in a mobile web browser overlaying web page content.

Referring to FIG. 3, in a particular non-limiting embodiment, a software module for displaying a radially-distributed menu of destinations for identified content has displayed a pie or radial menu of online content sharing destinations in response to a user's interaction with a touch screen display. In this embodiment, five menu items represent destinations including Facebook 200, Twitter 210, Instapaper 230, and Tumblr 240 with associated icons and colors. In this embodiment, a pie menu of destinations is opaque and displayed overlaying the identified content 260.

In some embodiments, a module for displaying a radially-distributed menu of content sharing destinations displays a number of destinations limited by the number that the menu can display simultaneously. In other embodiments, a module for displaying a radially-distributed menu of destinations responds to a third user interaction by changing destinations displayed. In further embodiments, menu items are changed in response to a user interaction indicating a desire to view or access additional sharing destinations for identified content (e.g., switch menu items, rotate through menu items, scroll through menu items, etc.). For example, in various embodiments, a third user interaction is, by way of non-limiting example, tap and drag, touch and drag, click and drag, swipe, multipoint touch and rotate, and scroll.

In some embodiments, a software module for displaying a radially-distributed menu of destinations for identified content displays the same menu, optionally configured by a user, regardless of the content identified for sharing. In other embodiments, a software module for displaying a radially-distributed menu of destinations for identified content displays a menu that is dynamically configured based on the content indentified (e.g., a context sensitive or contextual menu). For example, identification of a photograph may trigger the software module to display a radially-distributed menu of destinations that includes Flickr, Picasa, Shutterfly, Photobucket, and Snapfish. By way of further example, identification of a video may trigger the software module to display a radially-distributed menu of destinations that includes YouTube and Vimeo. In some embodiments, a software module for displaying a radially-distributed menu of destinations for identified content displays a menu that is dynamically configured based on the source or location of the content indentified.

In some embodiments, a software module for displaying a radially-distributed menu of destinations for identified content allows a user to select at least one destination. In some embodiments, a radially-distributed menu of destinations allows a user to select one menu item representing one destination at a time. In various embodiments, a radially-distributed menu of destinations allows a user to simultaneously select 2, 3, 4, 5, 6, 7, 8, 9, 10, 11, 12, 13, 14, 15, 16, 17, 18, 19, 20, 21, 22, 23, 24, 25, 26, 27, 28, 29, 30 or more menu items representing as many destinations. For example, in further embodiments, a radially-distributed menu of destinations allows a user to serially select a plurality of menu items, each representing a destination. In other embodiments, a radially-distributed menu of destinations allows a user to simultaneously select all menu items, and therefore all destinations displayed. For example, in further embodiments, a radially-distributed menu of destinations allows a user to select the center of a menu to simultaneously select all menu items. By way of further example, a radially-distributed menu of destinations includes a special menu item, selection of which, simultaneously selects all other menu items.

In some embodiments, a software module for displaying a radially-distributed menu of destinations for identified content includes an optional marking menu mode. In further embodiments, a marking menu mode is a mode of operation wherein a menu allows a user to perform a menu selection by making a straight mark or gesture in the direction of the desired menu item without displaying the actual menu. In still further embodiments, once a user learns the identity of each menu item available in a radially-distributed menu of destinations and their relative positions in the menu, they optionally enable a marking menu mode to increase speed and efficiency of making menu selections. In some embodiments, a marking menu mode is configurable via a software module for customizing a radially-distributed menu of destinations.

Menu of Individuals

In some embodiments, the systems, platforms, media, applications, and methods described herein include a software module for displaying a radially-distributed menu of individuals associated with one or more destinations, or provision and/or use of the same. In some embodiments, a radially-distributed menu of individuals includes menu items arranged in a pattern that radiates from a point. In further embodiments, menu items are arranged in a pattern wherein each menu item radiates the same distance from a point, forming a circle. In other embodiments, menu items are arranged in a pattern wherein menus items radiate the same and/or different distances from a point, forming a particular shape. Accordingly, a radially-distributed menu has many suitable shapes and sizes. Suitable shapes include, by way of non-limiting examples, substantially circular, semi-circular, partially circular, substantially ovoid, semi-ovoid, substantially square, substantially diamond, substantially rectangular, substantially triangular, substantially pentagonal, substantially hexagonal, substantially octagonal, and the like. Suitable sizes are generally regulated by available display space and by the number of menu items.

A software module for displaying a radially-distributed menu of individuals associated with one or more destinations suitably displays menu items in a wide variety of forms. In some embodiments, each menu item represents an individual associated with one or more destinations. Any representation that identifies an individual to a user is suitable. In further embodiments, a menu item represents an individual with, by way of non-limiting examples, text (e.g., a name, a description, etc.), an icon, a photograph, an illustration, a shape, a symbol, a letter, a number, a color, and combinations thereof.

In some embodiments, a software module for displaying a radially-distributed menu of individuals associated with one or more destinations displays a pie menu or a radial menu. Radially-distributed menus, such as pie menus or radial menus, have advantages over linear menus described further herein.

A radially-distributed menu of individuals associated with one or more destinations described herein suitably displays a wide range of numbers of menu items. In various embodiments, a radially-distributed menu of destinations simultaneously displays 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 or more menu items. In some embodiments, a radially-distributed menu of individuals simultaneously displays about 2 to about 20 menu items. In further embodiments, a radially-distributed menu of individuals simultaneously displays about 3 to about 16 menu items. In further embodiments, a radially-distributed menu of individuals simultaneously displays about 4 to about 12 menu items. In further embodiments, a radially-distributed menu of individuals simultaneously displays about 5 to about 10 menu items. In further embodiments, a radially-distributed menu of individuals simultaneously displays about 6 to about 8 menu items.

In some embodiments, a software module for displaying a radially-distributed menu of individuals associated with one or more destinations displays an opaque menu. In other embodiments, a software module for displaying a radially-distributed menu of individuals associated with one or more destinations displays a partially transparent menu. In further embodiments, a partially transparent menu allows a user to observe content underlying an activated menu.

Figure 4:
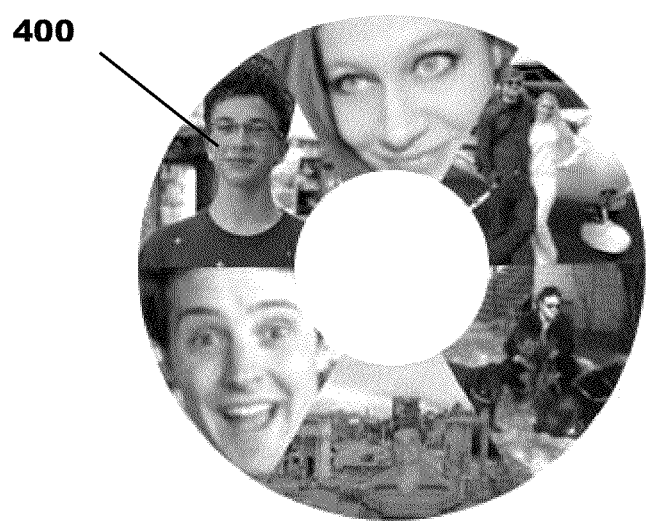
FIG. 4 shows a non-limiting example of a radially-distributed menu of individuals associated with a content sharing destination; in this case, a pie menu of Facebook friends.

Referring to FIG. 4, in a particular non-limiting embodiment, a software module for displaying a radially-distributed menu of individuals associated with one or more destinations displays a pie menu or radial menu of individuals associated with a Facebook destination. In this embodiment, each of six menu items 400 represents an individual with a photograph.

In some embodiments, a software module for displaying a radially-distributed menu of individuals associated with one or more destinations displays a menu in response to a second user interaction. In further embodiments, a menu of individuals is displayed in response to a user interaction indicating a desire to select one or more individuals with whom to share content. In some embodiments, a second user interaction is an interaction with a radially-distributed menu of destinations for content identified for sharing. In further embodiments, a radially-distributed menu of individuals is centered on or near the location of a selected menu item in a menu of destinations. In some embodiments, a menu of individuals is displayed in response to user interaction via a pointing device including, by way of non-limiting examples, a mouse, trackball, trackpad, joystick, pen, or stylus. In further embodiments, a second user interaction is, by way of non-limiting examples, click, click and hold, double click, right click, shift-click, control-click, command-click, drag, draw, and highlight. In some embodiments, a menu of individuals is displayed in response to user interaction via a touch screen display or multi-touch screen display. In further embodiments, a second user interaction is, by way of non-limiting examples, tap (e.g., touch), double tap, tap (e.g., touch) and hold, swipe, drag, pinch, reverse pinch, draw, and highlight.

In some embodiments, a menu of individuals is displayed in response to user interaction via a keyboard, keypad, or alternative text input device. In further embodiments, a second user interaction is a keystroke, combination of keystrokes, or sequence of keystrokes. In other embodiments, a menu of individuals is displayed in response to user interaction via a microphone to capture voice or other sound input. In further embodiments, a second user interaction is a voice command. In a particular embodiment, a voice command includes a component to trigger display of a menu of individuals, for example, a user speaking "email contacts." In a further embodiment, a voice command includes a component to select one or more individuals from the menu of individuals, for example, a user speaking "all." In this non-limiting example, a voice command such as "email contacts . . . all" would both cause a software module for displaying a radially-distributed menu of individuals to appear over currently selected content and select a particular group of individuals with whom to share the content. In other embodiments, a menu of individuals is displayed in response to user interaction via a video camera to capture motion or visual input. In further embodiments, a second user interaction is a gesture. In still further embodiments, a second user interaction is a combination of interactions described herein.

Figure 5:
FIG. 5 shows a non-limiting example of a radially-distributed menu of individuals associated with a content sharing destination; in this case, a pie menu displayed in response to a user's interaction with a touchscreen of a mobile device. In this example, a pie menu of individuals is displayed in a mobile web browser overlaying web page content.

Referring to FIG. 5, in a particular non-limiting embodiment, a software module for displaying a radially-distributed menu of individuals associated with one or more destinations has displayed a pie or radial menu of individuals in response to a user's interaction with a touch screen display of a mobile device. In this embodiment, each of seven menu items 400 represents an individual with a photograph. In this embodiment, a pie menu of individuals is opaque and displayed overlaying the identified content 260.

Figure 6:
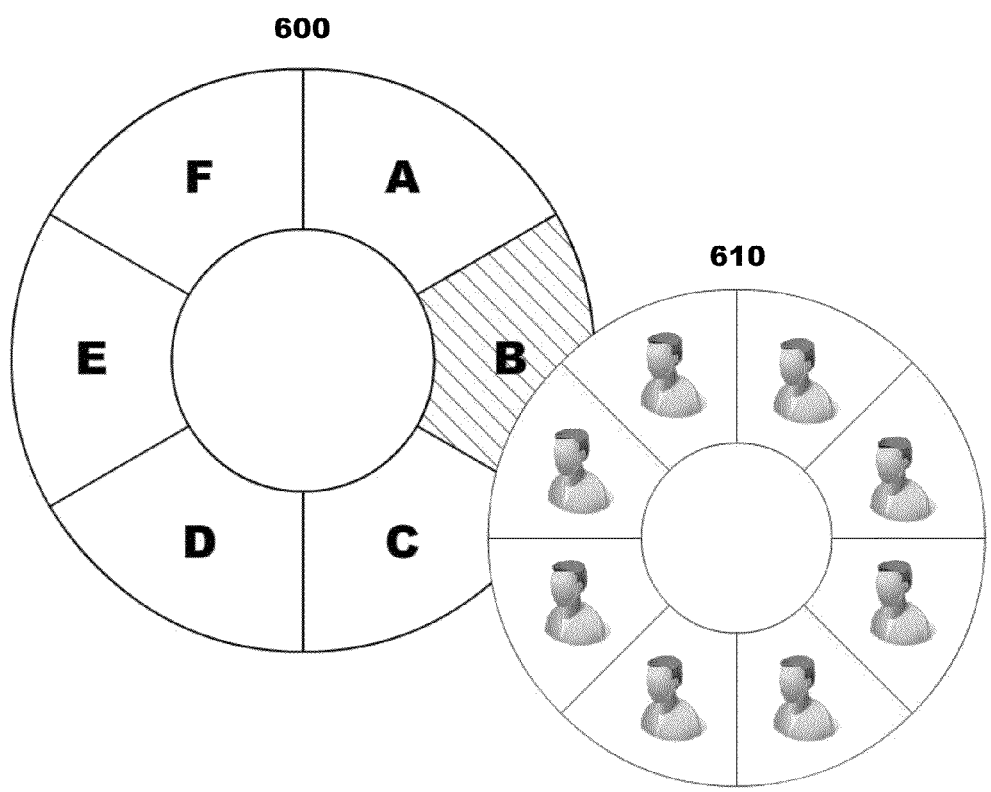
FIG. 6 shows a non-limiting example of a first radially-distributed menu 600 with menu items representing content sharing destinations A-F. In this example, a user has interacted with menu item B (by for example click, touch, tap, or voice command). In response to this interaction, a second radially-distributed menu 610 with menu items representing individuals associated with destination B are displayed. Further in this example, each individual is represented by a photograph.

Referring to FIG. 6, in a particular non-limiting embodiment, a first radially-distributed menu 600 is displayed with menu items representing content sharing destinations A-F. In this embodiment, a first radially-distributed menu of destinations 600 is a pie menu. As described herein, destinations A-F suitably include destinations such as email, instant messaging, social networks, blogs, online platforms, mobile destinations, and the like. In this embodiment, destination B is a group of individuals associated with a content sharing destination. FIG. 6 further depicts a scenario wherein a user has interacted with destination B by, for example, click, touch, tap, swipe, or voice command. In response to this interaction, a second radially-distributed menu 610 with menu items representing individuals associated with the group of destination B are displayed, each represented by a profile photograph.

In some embodiments, a module for displaying a radially-distributed menu of individuals associated with one or more destinations displays a number of individuals limited by the number that the menu can display simultaneously. In other embodiments, a module for displaying a radially-distributed menu of individuals responds to a third user interaction by changing individuals displayed. In further embodiments, menu items are changed in response to a user interaction indicating a desire to view or access additional individuals (e.g., switch menu items, rotate through menu items, scroll through menu items, etc.). For example, in various embodiments, a third user interaction is, by way of non-limiting example, tap and drag, touch and drag, click and drag, swipe, multipoint touch and rotate, and scroll.

In some embodiments, a software module for displaying a radially-distributed menu of individuals associated with one or more destinations displays the same menu, optionally configured by a user, regardless of the content identified for sharing. In other embodiments, a software module for displaying a radially-distributed menu of individuals associated with one or more destinations displays a menu that is dynamically configured based on the content indentified (e.g., a context sensitive or contextual menu). For example, a user optionally associates one or more individuals with particular types of content and/or subject matter. By way of further example, a user optionally utilizes a software module for customizing a radially-distributed menu of individuals to associate one or more individuals with video content. By way of further example, a user optionally utilizes a software module for customizing a radially-distributed menu of individuals to associate one or more individuals with content about sports. In some embodiments, a software module for displaying a radially-distributed menu of individuals associated with one or more destinations displays a menu that is dynamically configured based on the source or location of the content indentified.

In some embodiments, a software module for displaying a radially-distributed menu of individuals associated with one or more destinations allows a user to select at least one individual. In some embodiments, a radially-distributed menu of destinations allows a user to select one menu item representing one individual at a time. In various embodiments, a radially-distributed menu of individuals allows a user to simultaneously select 2, 3, 4, 5, 6, 7, 8, 9, 10, 11, 12, 13, 14, 15, 16, 17, 18, 19, 20, 21, 22, 23, 24, 25, 26, 27, 28, 29, 30 or more menu items representing as many individuals. For example, in further embodiments, a radially-distributed menu of individuals allows a user to serially select a plurality of menu items, each representing an individual. In other embodiments, a radially-distributed menu of individuals allows a user to simultaneously select all menu items, and therefore all individuals displayed. For example, in further embodiments, a radially-distributed menu of destinations allows a user to select the center of a menu to simultaneously select all menu items. By way of further example, a radially-distributed menu of individuals includes a special menu item, selection of which, simultaneously selects all other menu items.

In some embodiments, a software module for displaying a radially-distributed menu of individuals associated with one or more destinations includes an optional marking menu mode described further herein. In some embodiments, a marking menu mode is configurable via a software module for customizing a radially-distributed menu of individuals.

Customization

In some embodiments, the systems, platforms, media, applications, and methods described herein include a software module for customizing radially-distributed menus, or provision and/or use of the same. In further embodiments, a software module for customizing radially-distributed menus allows customization of radially-distributed menus of destinations and radially-distributed menus of individuals.

Many aspects of radially-distributed menus are suitable for customization. In various embodiments, a software module for customizing radially-distributed menus allows a user to customize, by way of non-limiting examples, menu appearance, menu items, and user interactions. In further embodiments, a software module for customizing radially-distributed menus allows a user to select a color, transparency, shape, and/or orientation for a menu. In further embodiments, a software module for customizing radially-distributed menus allows a user to select the number menu items displayed simultaneously. In further embodiments, a software module for customizing radially-distributed menus allows a user to add, remove, or select destinations. In further embodiments, a software module for customizing radially-distributed menus allows a user to add, remove, or select individuals. In further embodiments, a software module for customizing radially-distributed menus allows a user to select a user interaction to activate or trigger a menu. In further embodiments, a software module for customizing radially-distributed menus allows a user to select a user interaction to change the menu items of a menu. In still further embodiments, a software module for customizing radially-distributed menus allows a user to configure parameters of a user interaction such as, the duration of a hold, the timing between clicks of a double click, and/or direction of a swipe.

Figure 7:
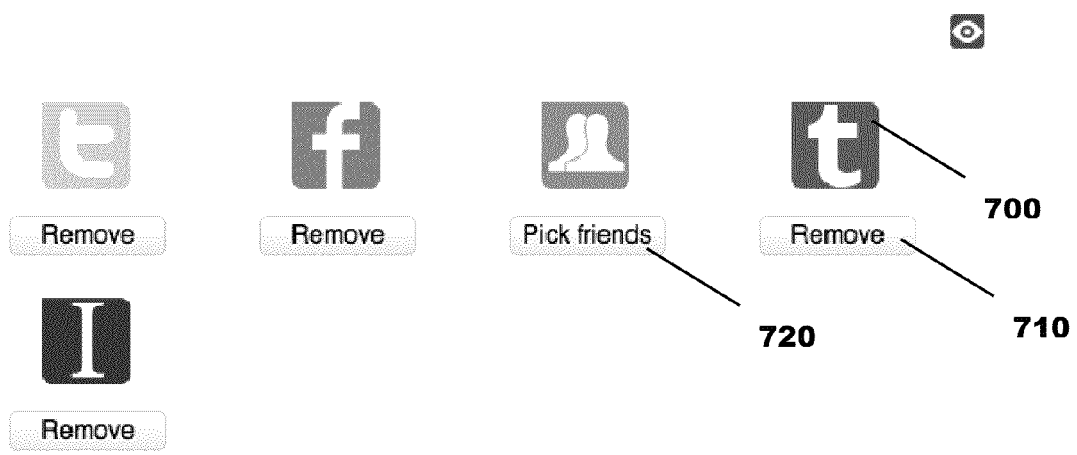
FIG. 7 shows a non-limiting example of a GUI for a software module for customizing a radially-distributed menu of destinations and a radially-distributed menu of individuals; in this case, a GUI allowing addition of destinations, removal of destinations, and selection of individuals associated with a social network destination.

Referring to FIG. 7, in a particular non-limiting embodiment, a software module for customizing radially-distributed menus of destinations and radially-distributed menus of individuals includes a GUI to communicate the currently configured destinations. In this embodiment, a software module for customizing radially-distributed menus of destinations and radially-distributed menus of individuals includes a GUI allowing a user to add or remove individual content sharing destinations. Further, in this embodiment, each configured destination is represented by an icon 700 and each configured destination is associated with a GUI element to remove the destination 710. In the case where a destination includes one or more individuals, a GUI element is provided to allow a user to add or remove individuals from the destination population 720.

Annotation

In some embodiments, the systems, platforms, media, applications, and methods described herein include a software module for annotating shared content, or provision and/or use of the same. In further embodiments, a software module for annotating shared content allows a user to create a message (e.g., annotation) that is associated with shared content. Messages (e.g., annotations) are suitably created in many formats. In various embodiments, suitable message formats include text, image, audio, video, or multimedia, including combinations thereof. For example, in a particular non-limiting embodiment, a software module for annotating shared content opens a dialog box and allows a user to type text that is associated with content shared via social network post. By way of further example, a software module for annotating shared content activates a microphone in a processing device and allows a user to speak a message that is recorded as an audio file and associated with content shared via email. By way of further example, a software module for annotating shared content activates a camera in a processing device and allows a user to capture a photograph that is associated with content shared via microblog post.

Sharing Content

In some embodiments, the systems, platforms, media, applications, and methods described herein include a software module for sending content identified for sharing to selected destinations and/or individuals via one or more electronic communications channels, or provision and/or use of the same. In further embodiments, a software module for sending content utilizes, by way of non-limiting examples, Transmission Control Protocol/Internet Protocol (TCP/IP), including for example, Hypertext Transfer Protocol (HTTP), Simple Mail Transfer Protocol (SMTP), File Transfer Protocol (FTP), Secure Shell (SSH), Post Office Protocol (POP), and Internet Message Access Protocol (IMAP), and combinations thereof to send content to selected destinations and/or individuals. In further embodiments, a software module for sending content utilizes, by way of non-limiting examples, Short Message Service (SMS), Multimedia Message Service (MMS), web-based email, instant messaging, voicemail, Voice over Internet Protocol (VoIP), and combinations thereof to send content to selected destinations and/or individuals.

In some embodiments, a software module for sending content identified for sharing to selected destinations and/or individuals sends an address for content, such as a Uniform Resource Locator (URL) or a Uniform Resource Identifier (URI). In other embodiments, a software module for sending content identified for sharing to selected destinations and/or individuals sends the content, a copy of the content, or a representation of the content.

In embodiments including a software module for annotating shared content, where a user annotates content, an annotation (e.g., text, image, audio, video, multimedia, or a combination thereof) is sent in association with content identified for sharing. In further embodiments, an annotation is sent, for example, in series with content, in parallel with content, or appended to content.

Data Tracking and Business Methods

The inventions disclosed herein include business methods. In further embodiments, the content sharing applications disclosed herein are produced, distributed, marketed, advertised, and sold as, for example, browser extensions, mobile applications, and standalone applications. In some embodiments, the content sharing applications disclosed herein are utilized to generate revenue through referral fees (e.g., click through, conversion, etc.). In some embodiments, the content sharing applications disclosed herein are utilized to enhance a web application, such as a social application or a networking application.

In some embodiments, the systems, platforms, media, applications, and methods described herein include a software module for storing content sharing data, or provision and/or use of the same. In further embodiments, a software module for storing content sharing data captures, stores, and analyzes data relating to content sharing. In various embodiments, content sharing data includes, by way of non-limiting examples, individuals sharing content, content shared, type of content shared, subject matter of content shared, destinations for shared content, recipients of shared content. In further embodiments, a software module for storing content sharing data detects trends and uses historical data to make predictions regarding content sharing.

Digital Processing Device

In some embodiments, the systems, platforms, media, applications, and methods described herein include a digital processing device, or use of the same. In further embodiments, a digital processing device includes one or more hardware central processing units (CPU) that carry out the device's functions. In some embodiments, a digital processing device further comprises an operating system configured to perform executable instructions. In some embodiments, a digital processing device is optionally connected a computer network. In further embodiments, a digital processing device is optionally connected to the Internet such that it accesses the World Wide Web. In still further embodiments, a digital processing device is optionally connected to a cloud computing infrastructure. In other embodiments, a digital processing device is optionally connected to an intranet. In other embodiments, a digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, and video game consoles. In view of the disclosure provided herein, those of skill in the art will recognize that many smartphones are suitable for use in the systems described herein. Those of skill in the art will also recognize that select televisions, video players, and digital music players with optional computer network connectivity are suitable for use in the systems described herein. Suitable tablet computers include those with booklet, slate, and convertible configurations, known to those of skill in the art.

In some embodiments, a digital processing device includes an operating system configured to perform executable instructions. An operating system is, for example, software, including programs and data, which manages a device's hardware and provides services for execution of applications. In view of the disclosure provided herein, those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. In view of the disclosure provided herein, those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, an operating system is provided by cloud computing. In view of the disclosure provided herein, those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, a digital processing device includes a storage and/or memory device. A storage and/or memory device is one or more physical apparatuses used to store data or programs on a temporary or permanent basis. In some embodiments, a memory device is volatile memory and requires power to maintain stored information. In some embodiments, a memory device is non-volatile memory and retains stored information when the digital processing device is not powered. In further embodiments, a non-volatile memory comprises flash memory. In some embodiments, a non-volatile memory comprises dynamic random-access memory (DRAM). In some embodiments, a non-volatile memory comprises ferroelectric random access memory (FRAM). In some embodiments, a non-volatile memory comprises phase-change random access memory (PRAM). In other embodiments, a memory device is a storage device including, by way of non-limiting examples, CD-ROMs, DVDs, flash memory devices, magnetic disk drives, magnetic tapes drives, optical disk drives, and cloud computing based storage. In further embodiments, a storage and/or memory device is a combination of devices such as those disclosed herein.

In some embodiments, a digital processing device includes a display to send visual information to a user. In some embodiments, a display is a cathode ray tube (CRT). In some embodiments, the display is a liquid crystal display (LCD). In further embodiments, a display is a thin film transistor liquid crystal display (TFT-LCD). In some embodiments, a display is an organic light emitting diode (OLED) display. In various further embodiments, an OLED display is a passive-matrix OLED (PMOLED) or active-matrix OLED (AMOLED) display. In some embodiments, a display is a plasma display. In other embodiments, a display is a video projector. In still further embodiments, a display is a combination of devices such as those disclosed herein.

In some embodiments, a digital processing device includes an input device to receive information from a user. In some embodiments, an input device is a keyboard. In some embodiments, an input device is a pointing device including, by way of non-limiting examples, a mouse, trackball, track pad, joystick, game controller, or stylus. In some embodiments, an input device is a touch screen or a multi-touch screen. In other embodiments, an input device is a microphone to capture voice or other sound input. In other embodiments, an input device is a video camera to capture motion or visual input. In still further embodiments, an input device is a combination of devices such as those disclosed herein.

Computer Network

In some embodiments, the systems, platforms, media, applications, and methods disclosed herein comprise a digital processing device that is optionally connected to a computer network. As used herein, a "computer network" means a collection of computers and/or devices interconnected by communications channels that facilitate communications among users and allow users to share resources. In view of the disclosure provided herein, a suitable computer network is created by techniques known to those of skill in the art using hardware, firmware, and software known to the art. In some embodiments, a computer network is a private network such as an intranet. In some embodiments, a computer network is the Internet. In further embodiments, the Internet provides access to the World Wide Web and an application is provided to a digital processing device via the Web. In still further embodiments, the Internet provides access to the World Wide Web and an application is provided to a digital processing device via cloud computing. In other embodiments, a computer network further comprises any suitable data storage device. Suitable data storage devices include, by way of non-limiting examples, CD-ROMs, DVDs, flash memory devices, magnetic disk drives, optical disk drives, cloud computing systems and services, and the like. In further embodiments, an application is provided to a digital processing device via a data storage device.

Computer Readable Storage Medium

In some embodiments, the systems, platforms, media, applications, and methods disclosed herein include one or more computer readable storage_media encoded with a program including instructions executable by the operating system of an optionally networked digital processing device. In further embodiments, a computer readable storage_medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the systems, platforms, media, applications, and methods disclosed herein include at least one computer program. A computer program includes a sequence of instructions, executable in the digital processing device's CPU, written to perform a specified task. In light of the disclosure provided herein, those of skill in the art will recognize that a computer program may be written in various versions of various languages. In some embodiments, a computer program comprises one sequence of instructions. In some embodiments, a computer program comprises a plurality of sequences of instructions. In various embodiments, a computer program comprises a file, a section of code, a programming object, a programming structure, or combinations thereof. In further various embodiments, a computer program comprises a plurality of files, a plurality of sections of code, a plurality of programming objects, a plurality of programming structures, or combinations thereof. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, or Tcl. In some embodiments, a web application is written to some extent in a database query language such as Structured Query Language (SQL).

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

The systems, platforms, media, applications, and methods disclosed herein include, in various embodiments, software, server, and database modules. In view of the disclosure provided herein, software modules are created by techniques known to those of skill in the art using machines, software, and languages known to the art. The software modules disclosed herein are implemented in a multitude of ways. In various embodiments, the one or more software modules comprise, by way of non-limiting examples, a web application, a mobile application, a standalone application, and a web browser extension, plug-in, add-in, or add-on, including parts thereof. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

EXAMPLES

The following illustrative examples are representative of embodiments of the media, software applications, and systems described herein and are not meant to be limiting in any way.

Example 1

A university student downloads and installs a content sharing extension for the web browser on his laptop computer. An icon appears on his browser's tool bar. He clicks the icon using his laptop's trackpad to open a module for customization of the application. He configures the application to connect with his Facebook account, his Tumblr account, and his YouTube channel and specifies that the application display these content sharing destinations in a pie menu whenever he double clicks on a piece of content. He further configures the application to include a Facebook friends content sharing destination, which when clicked displays a second pie menu of twenty of his Facebook friends, ten at a time.

While browsing the web between classes, he reads an article that he finds interesting and decides that he would like to share it. He double clicks on the web page to reveal a pie menu of destinations. He clicks once on the Facebook friends destination, which reveals a second pie menu representing the first ten of his specified friends with their names and profile photos. The second pie menu of friends is centered on the point where he clicked to make a selection in the first menu of destinations. He clicks and drags on the second menu to change the menu items and access the second ten of his specified friends. Deciding to share the article with all of his friends, he clicks in the center of the menu to select all, which closes the pie menus and opens an annotation window. He types a brief message about the article and sends the URL to each of his specified friends via Facebook. He then uses the trackpad of his laptop to highlight a specific paragraph of the article. He double clicks on the highlighted content to repeat the process, however, sending the text of the paragraph, without annotation, to one friend in particular.

Example 2

A political blogger downloads and installs a mobile content sharing application onto her Apple® iPhone®. When she starts the application for the first time, a module for customization prompts her to select destinations for shared content. She configures the application to connect with her Twitter account, her professional blog, and her professional email account. She also configures the application to display all three destinations on a 50% transparent, triangular menu. She also configures the menu of destinations to be displayed in response to her touching and holding over selected content for more than 500 milliseconds on the touch screen display of her smartphone.

The application runs in the background to detect the configured user interaction and is available from her mobile operating system and all other applications including her mobile browser, her document editor, and her photo management application. She attends a local political campaign speech where she takes several photographs and records a short audio file of the speech. She wishes to immediately share the content with those that follow her writing. By touching and holding on the files she opens a menu of destinations, which appears over the content. She touches an icon representing her Twitter account and then an icon representing her blog. An annotation window opens and she types a brief message to accompany the content. When she is finished, her text message and links to the photographs and audio file are posted to her Twitter feed and her blog simultaneously.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. Non-transitory computer readable storage media encoded with a computer program including instructions executable by a digital processing device to create a content sharing application comprising:
   a. a software module for identifying content to share in response to a first user interaction, the first user interaction comprising: i) a swipe, a touch, or a touch and hold by the user performed over the content to share, or ii) a click or click and hold by the user with a pointing device performed over the content to share;
   b. a software module for displaying a radially-distributed menu of destinations for identified content in response to the first user interaction, the menu of destinations allowing the user to select any of: one destination, a plurality of destinations, and all destinations, wherein each destination is a distinct network, forum, service, or application;
   c. a software module for displaying a radially-distributed menu of individuals associated with one or more displayed destinations in response to a second user interaction, the menu of individuals allowing the user to select any of: one individual, a plurality of individuals, and all individuals;
   d. a software module for annotating identified content; and
   e. a software module for providing a menu configuration interface, the menu configuration interface allowing the user to add or remove destinations and associate individuals with one or more destinations, whereby the user configures the menu items of the radially-distributed menu of destinations for identified content and the menu items of the radially-distributed menu of individuals associated with one or more destinations.

2. The media of claim 1, wherein said content comprises one or more of: a web site, a web page, text, a link, an image, a video, an audio, a multimedia, and an executable.

3. The media of claim 1, wherein said radially-distributed menu of destinations optionally displays between about 2 and about 14 destinations simultaneously.

4. The media of claim 1, wherein said radially-distributed menu of destinations is a pie menu.

5. The media of claim 1, wherein said module for displaying a radially-distributed menu of destinations responds to a third user interaction by replacing the destinations displayed.

6. The media of claim 1, wherein said module for displaying a radially-distributed menu of individuals responds to a third user interaction by replacing the individuals displayed.

7. The media of claim 1, wherein said module for annotating shared content allows the user to associate text, audio, video, or multimedia with shared content.

8. The media of claim 1, wherein said content sharing application is implemented as a web browser extension, plug-in, add-in, or add-on.

9. The media of claim 1, wherein said content sharing application is implemented as a mobile application.

10. A computer-implemented system for rapidly sharing content comprising:
    a. a networked digital processing device comprising an operating system configured to perform executable instructions and a memory device;
    b. a computer program including instructions executable by the digital processing device to create a content sharing application comprising:
       i. a software module for identifying content to share in response to a first user interaction, the first user interaction comprising: 1) a swipe, a touch, or a touch and hold by the user performed over the content to share, or 2) a click or click and hold by the user with a pointing device performed over the content to share;
       ii. a software module for displaying a radially-distributed menu of destinations for identified content in response to the first user interaction, the menu of destinations allowing the user to select any of: one destination, a plurality of destinations, and all destinations, wherein each destination is a distinct network, forum, service, or application;
       iii. a software module for displaying a radially-distributed menu of individuals associated with one or more displayed destinations in response to a second user interaction, the menu of individuals allowing the user to select any of: one individual, a plurality of individuals, and all individuals;
       iv. a software module for annotating identified content; and
       v. a software module for providing a menu configuration interface, the menu configuration interface allowing the user to add or remove destinations and associate individuals with one or more destinations, whereby the user configures the menu items of the radially-distributed menu of destinations for identified content and the menu items of the radially-distributed menu of individuals associated with one or more destinations.

11. The system of claim 10, wherein said content comprises one or more of: a web site, a web page, text, a link, an image, a video, an audio, a multimedia, and an executable.

12. The system of claim 10, wherein said radially-distributed menu of destinations optionally displays between about 2 and about 14 destinations simultaneously.

13. The system of claim 10, wherein said radially-distributed menu of destinations is a pie menu.

14. The system of claim 10, wherein said module for displaying a radially-distributed menu of destinations responds to a third user interaction by replacing the destinations displayed.

15. The system of claim 10, wherein said module for displaying a radially-distributed menu of individuals responds to a third user interaction by replacing the individuals displayed.

16. The system of claim 10, wherein said module for annotating shared content allows the user to associate text, audio, video, or multimedia with shared content.

17. The system of claim 10, wherein said computer program comprises a web browser extension, plug-in, add-in, or add-on.

18. The system of claim 10, wherein said networked digital processing device is a mobile device.

19. The system of claim 18, wherein said computer program comprises a mobile application.

20. A computer-implemented method for rapidly sharing content comprising the steps of:
   a. providing a software module for allowing a user to identify computer-based content to share in response to a first user interaction, the first user interaction comprising: i) a swipe, a touch, or a touch and hold by the user performed over the content to share, or ii) a click or click and hold by the user with a pointing device performed over the content to share;
   b. providing a software module for generating, on a computer display, a radially-distributed menu of destinations for identified content in response to the first user interaction, the menu of destinations allowing the user to select any of: one destination, a plurality of destinations, and all destinations, wherein each destination is a distinct network, forum, service, or application;
   c. providing a software module for generating, on a computer display, a radially-distributed menu of individuals associated with one or more destinations in response to a second user interaction, the menu of individuals allowing a the user to select any of: one individual, a plurality of individuals, and all individuals;
   d. providing a menu configuration software module for providing a menu configuration interface, the menu configuration interface allowing a user to add or remove destinations and associate individuals with one or more displayed destinations, whereby the user configures the menu items of the radially-distributed menu of destinations for identified content and the menu items of the radially-distributed menu of individuals associated with one or more destinations;
   e. providing a software module for annotating identified content; and
   f. sharing, by the internet, identified content to selected destinations and individuals.

21. The media of claim 1, wherein at least one destination is email.

22. The system of claim 10, wherein at least one destination is email.

* * * * *